United States Patent
Gunn et al.

(10) Patent No.: US 7,286,646 B2
(45) Date of Patent: Oct. 23, 2007

(54) SUBSCRIBER LINE VALIDATION OF A TELEPHONE NETWORK

(75) Inventors: Christopher W Gunn, Truro (GB); Christopher H Camps, Truro (GB)

(73) Assignee: British Telecommunications public limited company, London (GB)

( * ) Notice: Subject to any disclaimer, the term of this patent is extended or adjusted under 35 U.S.C. 154(b) by 529 days.

(21) Appl. No.: 10/513,031

(22) PCT Filed: May 13, 2003

(86) PCT No.: PCT/GB03/02056

§ 371 (c)(1),
(2), (4) Date: Nov. 1, 2004

(87) PCT Pub. No.: WO03/098903

PCT Pub. Date: Nov. 27, 2003

(65) Prior Publication Data

US 2005/0207540 A1    Sep. 22, 2005

(30) Foreign Application Priority Data

May 15, 2002    (EP) ................... 02253416

(51) Int. Cl.
*H04M 3/30* (2006.01)
*H04M 3/22* (2006.01)
*H04M 3/28* (2006.01)

(52) U.S. Cl. .................... 379/22; 379/9.04; 379/29.01; 379/29.09

(58) Field of Classification Search ............... 379/1.01, 379/9, 9.02–9.04, 10.01, 15.01, 15.05, 22, 379/22.02–22.03, 23, 27.01–27.02, 29.01, 379/29.09

See application file for complete search history.

(56) References Cited

U.S. PATENT DOCUMENTS

| 5,802,143 | A | * | 9/1998 | Borchering et al. .......... 379/33 |
| 5,946,372 | A | * | 8/1999 | Jones et al. ............... 379/10.01 |
| 6,002,746 | A | * | 12/1999 | Mulcahy et al. .............. 379/22 |
| 6,304,647 | B1 | | 10/2001 | Frost |

FOREIGN PATENT DOCUMENTS

| EP | 1098500 A2 | 5/2001 |
| GB | 2251530 | 7/1992 |
| GB | 2251530 A | 7/1992 |

OTHER PUBLICATIONS

International Search Report dated Jul. 23, 2003.
Smith, "Keeping the Records Straight", British Telecommunications Engineering, London, GB, vol. 10, NR. Part 1, pp. 71-74, XP000243344, no date.
European Search Report dated Sep. 16, 2002.
International Search Report, no date.
Smith, "Keeping the Records Straight", British Telecommunications Engineering, London, GB, vol. 10, NR. PART 1, pp. 71-74, XP000243344, no date.

* cited by examiner

Primary Examiner—Binh K. Tieu
(74) Attorney, Agent, or Firm—Nixon & Vanderhye P.C.

(57) ABSTRACT

A method of validating connection data for a node of a telephone network involves processing a report file for terminal pairs at a network node. The records in the report file are divided into three categories in dependence on the nature of the information in each record. A network status database is then updated with the report data category by category. Circuit IDs in the network status database that are deleted by updating in respect of records belonging to other then the last processed category are recorded against a record in the network status database corresponding to a record in the last processed category. Circuit IDs in the network status database that are deleted by updating in respect of last-processed category records are logged to provide a list of circuit IDs for which further investigation is required.

12 Claims, 6 Drawing Sheets

SUBSCRIBER LINE VALIDATION OF A TELEPHONE NETWORK

This application is the US national phase of international application PCT/GB03/02056 filed 13 May 2003 which designated the U.S. and claims benefit of EP 02253416.8, dated 15 May 2002, the entire content of which is hereby incorporated by reference.

The present invention relates to validating telephone network connection data.

Conventional telephone networks consist of millions of copper wire pairs linking exchanges, distribution points and subscriber equipment. At any given time, a portion of these pairs will not be allocated to a subscriber and, of the unallocated pairs, a portion will be unserviceable. Furthermore, the set of unallocated pairs changes rapidly with time as the demand for telephone lines by subscribers changes.

It is in the interest of a telephone network operator to have an up to date record of the state of the copper pairs in its network so that, for instance, unallocated pairs can be allocated to new connections. However, it is estimated that 20% of a typical established telephone network operator's records for copper pairs are incorrect.

Test equipment exists for checking copper pairs. This equipment includes exchange-based equipment and hand-held devices, such as are available from EML Ltd, at Unit 8c, Weldale Street, Reading, Berkshire, RG1 7BX and YP Unitesters at Hod Hasharon P.O. box: 1305, Israel. Generally, equipment of this type produces data files containing the results of the tests carried out. However, these data files are defined by the equipment manufacturers and no means has been provided for updating legacy network databases.

According to the present invention, there is provided a method of validating connection data for a node of a telephone network, the method comprising:

generating a report file for terminal pairs at a network node, the report comprising, for each terminal pair, a record including data identifying the terminal pair, data identifying an associated circuit ID (e.g. a telephone number), if any, data identifying the type of the line, if any, using the terminal pair and data reporting electrical testing of the line, if any, using the terminal pair;

allocating each record to one of three categories, the first category comprising terminal pairs for which there is an associated circuit ID, the second category comprising terminal pairs for which there is a line type but no circuit ID and the third category comprising unallocated lines;

for each record in the first category, updating a corresponding record in a network status database in dependence on the record;

for each record in the second category, updating a corresponding record in a network status database in dependence on the record; and for each record in the third category, updating a corresponding record in a network status database in dependence on the record, wherein circuit IDs in the network status database that are deleted by updating in respect of first and second category records are recorded against a record in the network status database corresponding to a third category record and circuit IDs in the network status database that are deleted by updating in respect of third category records are logged to provide a list of circuit IDs for which further investigation is required.

Preferably, a record in the network status database is only updated if it is older than the corresponding record in the report file.

Preferably, updating a circuit ID field in dependence on a first or second category record comprises searching for and deleting, if found, the replacing ID in the network status database records corresponding to the third category records.

Preferably, a method according to the present invention includes performing a validation process on the records from the report file, determining the proportion of well-formed records and proceeding with the updating of the network status with the well-formed records only if the well-formed records form a predetermined proportion, preferably greater then 90%, of the records in the report file.

According to the present invention, there is provided a method of validating connection data of a telephone network, the method comprising the steps of:

(a) selecting a telephone network exchange node on the basis of a spare capacity criterion or a record error criterion;

(b) performing a method of validating connection data for a node according to the present invention in respect of the selected node; and (c) selecting a further node in dependence on the updating of the network status database in step (b).

The further node may be a neighbouring telephone exchange node and be selected in the event that a circuit identity associated with the initially selected node in the network status database has not been located in step (b).

The further node may be a node connected to said initially selected node and is selected in the event that a network status database record is altered in step (b).

An embodiment of the present invention will now be described, by way of example, with reference to the accompanying drawings, in which.

Figure 1:
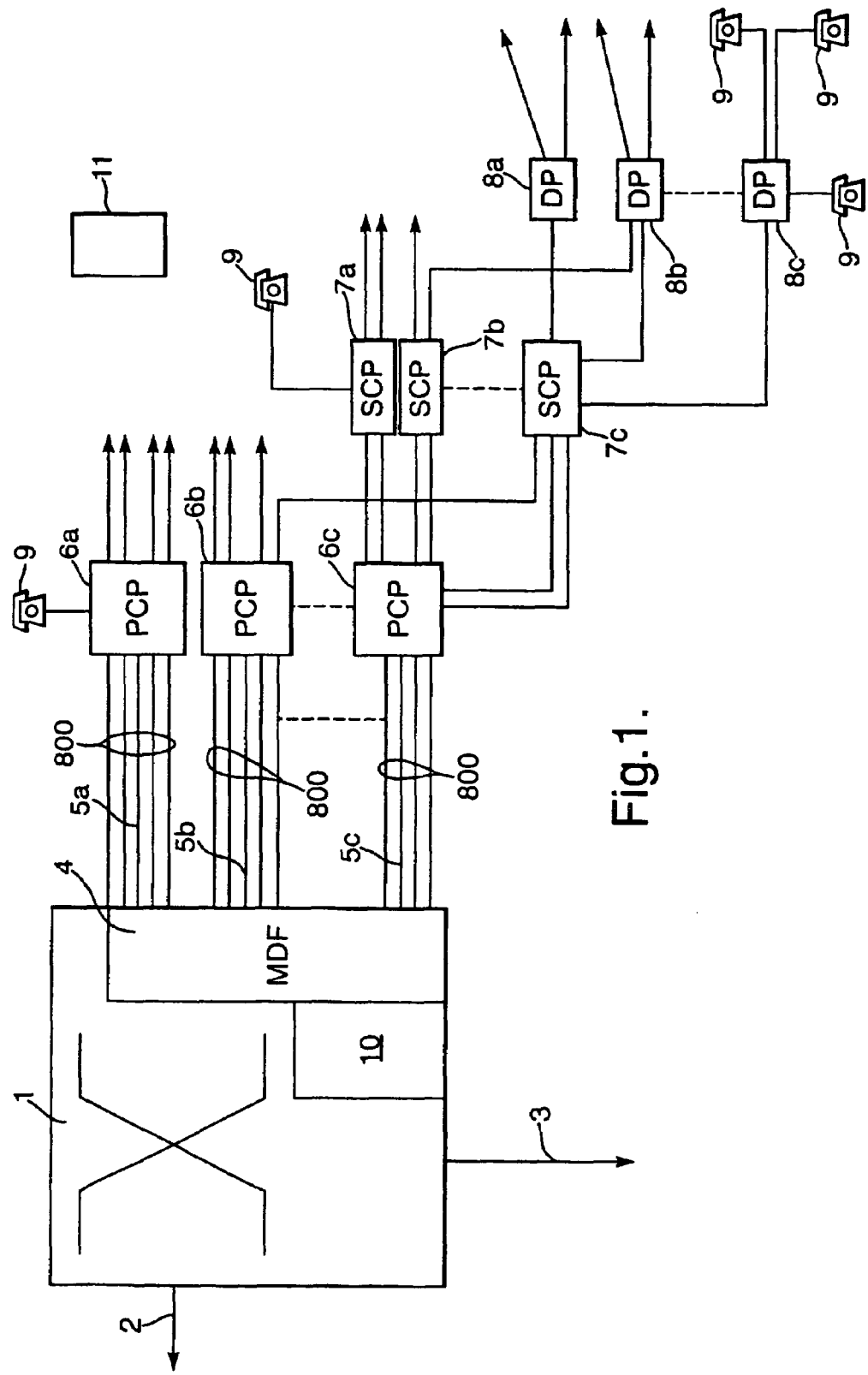
FIG. 1 illustrates part of a telephone network.

Referring to FIG. 1, a telephone exchange (also known as a "switch") 1 is provided with connections 2, 3 to other exchanges (not shown). The exchange 1 includes at least one MDF (Main Distribution Frame) 4 having typically many thousands of local loop connections. A plurality of cables, first second and third 5a, 5b, 5c shown, connect the MDF 4 to respective PCPs (Primary Connection Points), first, second and third 6a, 6b, 6c shown. Each cable consists of a number of copper pairs, e.g. 800.

The third PCP 6c is connected to a plurality of SCPs (Secondary Connection Points), first, second and third 7a, 7b, 7c shown. The other PCPs 6a, 6b are similarly connected to SCPs (not shown).

The third SCP 7c is connected to a plurality of DPs (Distribution Points), first, second and third 8a, 8b, 8c shown. The other SCPs 7a, 7b are similarly connected to DPs (not shown).

Finally, the third DP 8c is connected to a plurality of subscriber equipments 9. The other DPs 8a, 8b are similarly connected to subscriber equipments 9. Additionally, subscriber equipments can be connected directly to PCPs 6a, 6b, 6c and SCPs 7a, 7b, 7c.

Although the distribution arrangement shown in FIG. 1 has a generally tree-like form, it is not a perfect tree. For example, the third SCP 7a is connected to the second PCP 6b as well as the third PCP 6c and the second DP 8b is connected to the second SCP 7b as well as the third SCP 7c.

The copper pairs can be tested by means of a fixed test apparatus 10 connected to their terminals in the MDF 4 and a portable test apparatus 11 which is used to test copper wires at the PCPs 6a, 6b, 6c, SCPs 7a, 7b, 7c and DPs 8a, 8b, 8c.

Figure 2:
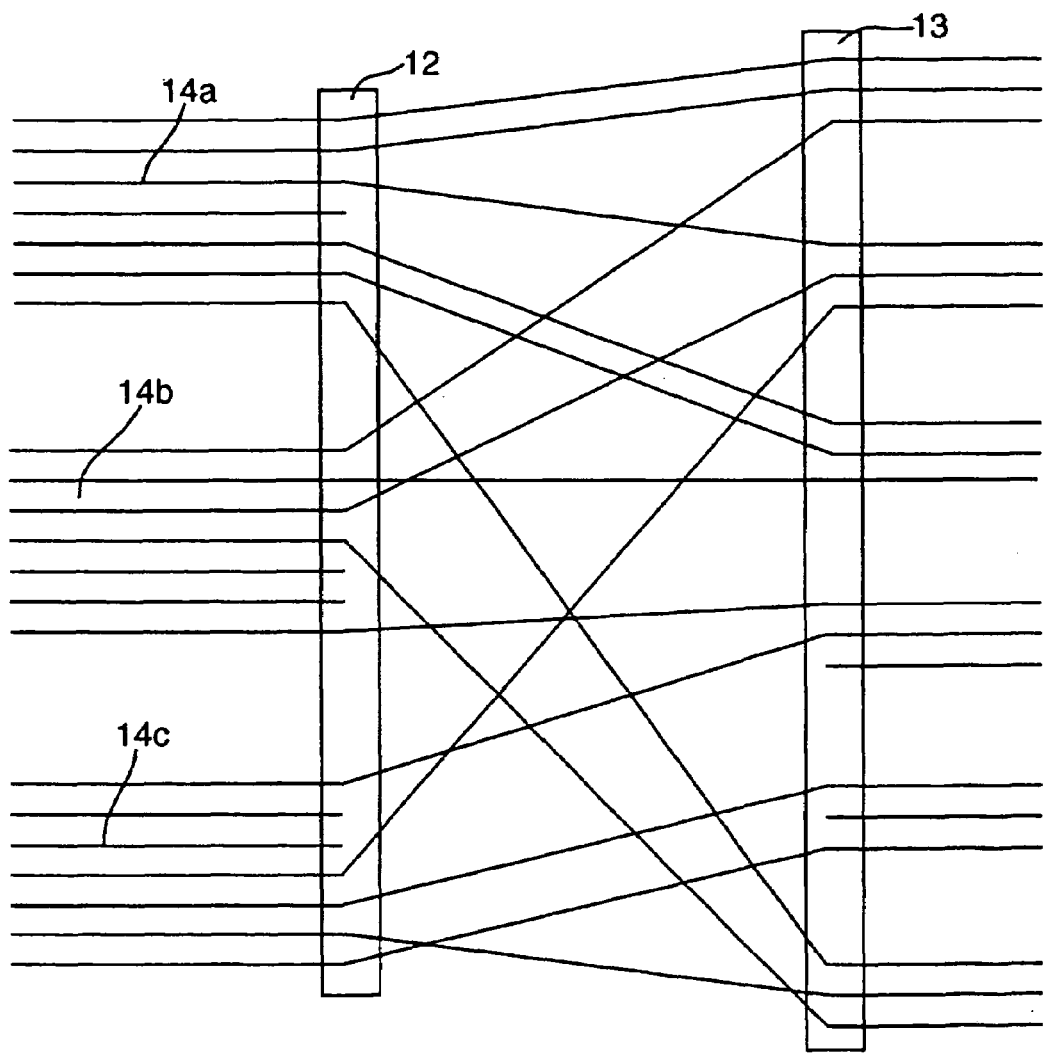
FIG. 2 is a simplified illustration of the wiring of a secondary connection point of FIG. 1.

Referring to FIG. 2 which illustrates a simplified SCP 7, the SCP 7 has an exchange-side terminal strip 12 and a distribution-side terminal strip 13. The copper pairs of first, second and third cables 14a, 14b, 14c are connected to terminals of the exchange-side terminal strip 12. The cables come from PCPs. For instance, in the case of the third SCP 7c, the first cable comes from the second PCP 6b and the second and third cables 14b, 14c come from the third PCP 6c. The copper pairs leading to subscriber equipments 9 and DPs 8a, . . . , 8c are connected to the distribution-side terminal strip. Connections are made between the exchange-side terminal strip 12 and the distribution-side terminal strip 13 as required and it can be seen in the present example some of the input and output copper pairs are unconnected.

The PCPs 6a, 6b, 6c and DPs 8a, 8b, 8c are similar to the SCPs 7a, 7b, 7c but on larger and smaller scales respectively.

The fixed and portable test apparatuses 10, 11 produce reports as text files. The reports comprise, for each terminal pair tested, an exchange ID, an node ID, a cable ID, a terminal pair ID, a circuit ID (e.g. telephone number) associated with the terminal pair, a line type code (e.g. analogue PSTN or digital ISDN), a test date, a test code and a test description. The test code and the test description indicate any faults detected. It will be appreciated that additional fields may be provided and that some fields, e.g. test code or test description, may be omitted.

One of the problems with this form of report is that it cannot be loaded simply into an existing, or "legacy", network state database. Manually entry is extremely time consuming and bearing in mind the millions of terminals pairs in a telephone network, a practical impossibility within the context of a systematic network-wide audit. Screen scraping technology can be employed to input data into legacy database systems. However, simply applying screen scraping to input the reports is not possible. The reports for an exchange take typically one week to generate. However, even during this time, the network is in flux as new connections are made and old connections are removed and these changes will be logged into the network state database as they happen. Therefore, it is inevitable that the report data will be incorrect.

The solution to this problem is to process the report data before it is entered into the network state database.

Figure 3:
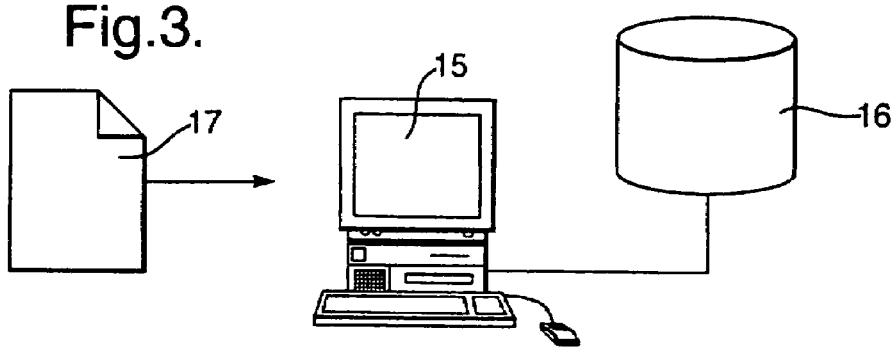
FIG. 3 illustrates an apparatus for use in performing the present invention.

Referring to FIG. 3, a system for use in an embodiment of the present invention comprises a personal computer 15 and a remote network status database 16. The computer 14 has access to the network status database 16 and can receive report files 17, by email for example, and process them for updating the network status database 16.

Figure 4:
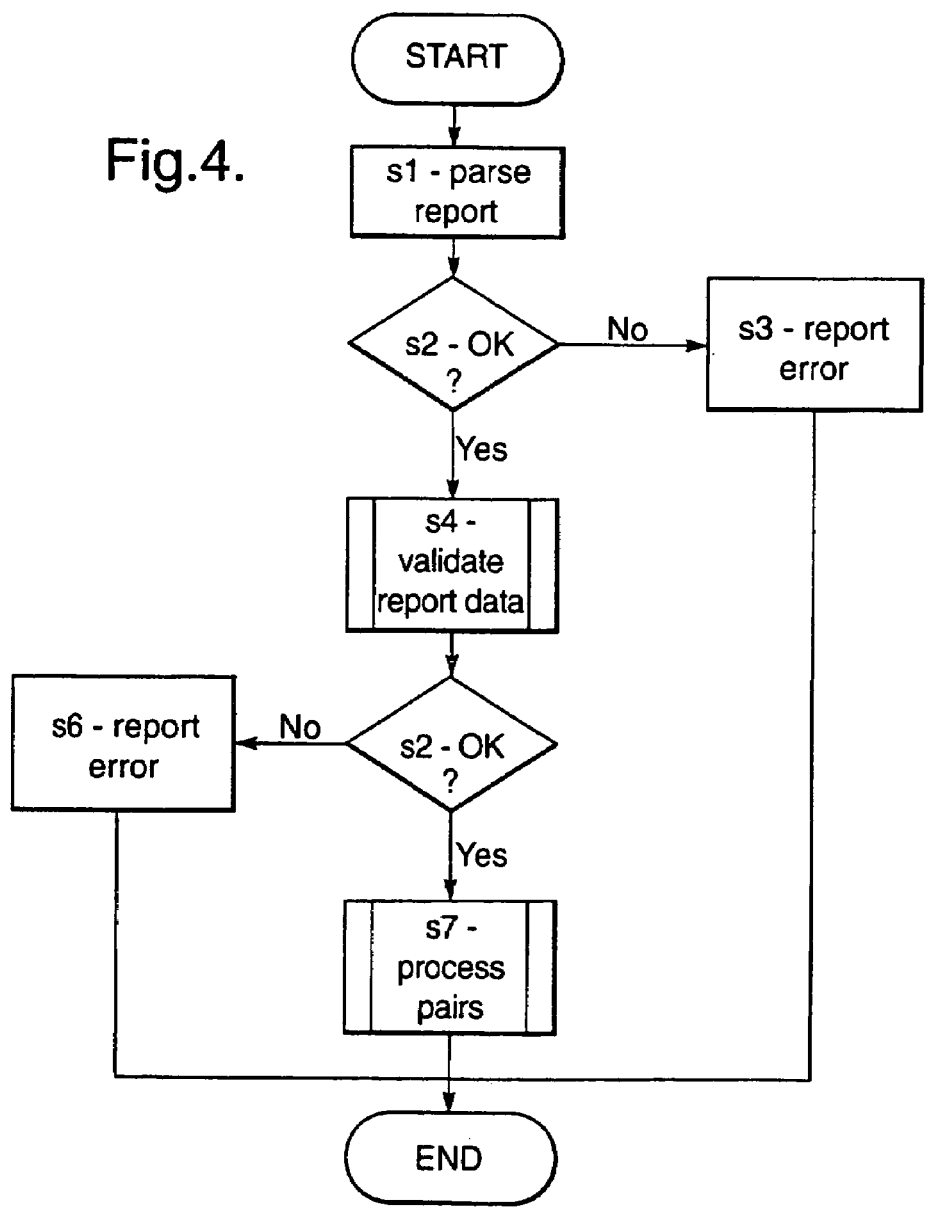
FIG. 4 is a flowchart illustrating the processing of terminal pair report data according to the present invention.

Referring to FIG. 4, which illustrates the operation of the computer 15 for updating the network status database 16, in order to update the network status database 16, a report file 17 is first parsed (step s1). If the parsing fails (step s2), an error is reported (step s3). However, if the parsing succeeds (step s2), the parsed data is validated (step s4).

In the validation step (step s4), the report data is checked for errors such as duplicate terminal pair IDs, garbled or mismatching test codes and descriptions. However, a report is not rejected merely because one error is found. A report is only rejected (step s5) and an error reported (step s6), if more than, for example, 46% of the lines in the report contain errors. Nevertheless, invalid lines will be removed from the report dataset, which is saved to a local SQL database, and the identities of the corresponding terminal pairs logged. The validated data is then processed and the network state database updated (step s7).

Each terminal pair is placed in one of three categories, categories A, B and C. Category A comprises terminal pairs for which a dial tone was detected and for which a call trace was successfully completed, i.e. allocated, fault-free PSTN connections. Category B comprises terminal pairs where the circuit type is known but is of type for which there is no circuit identity, e.g. ISDN connections. Category C contains "unallocated" pairs which may be electrically sound and therefore spare and available for use or electrically unsound.

Figure 5:
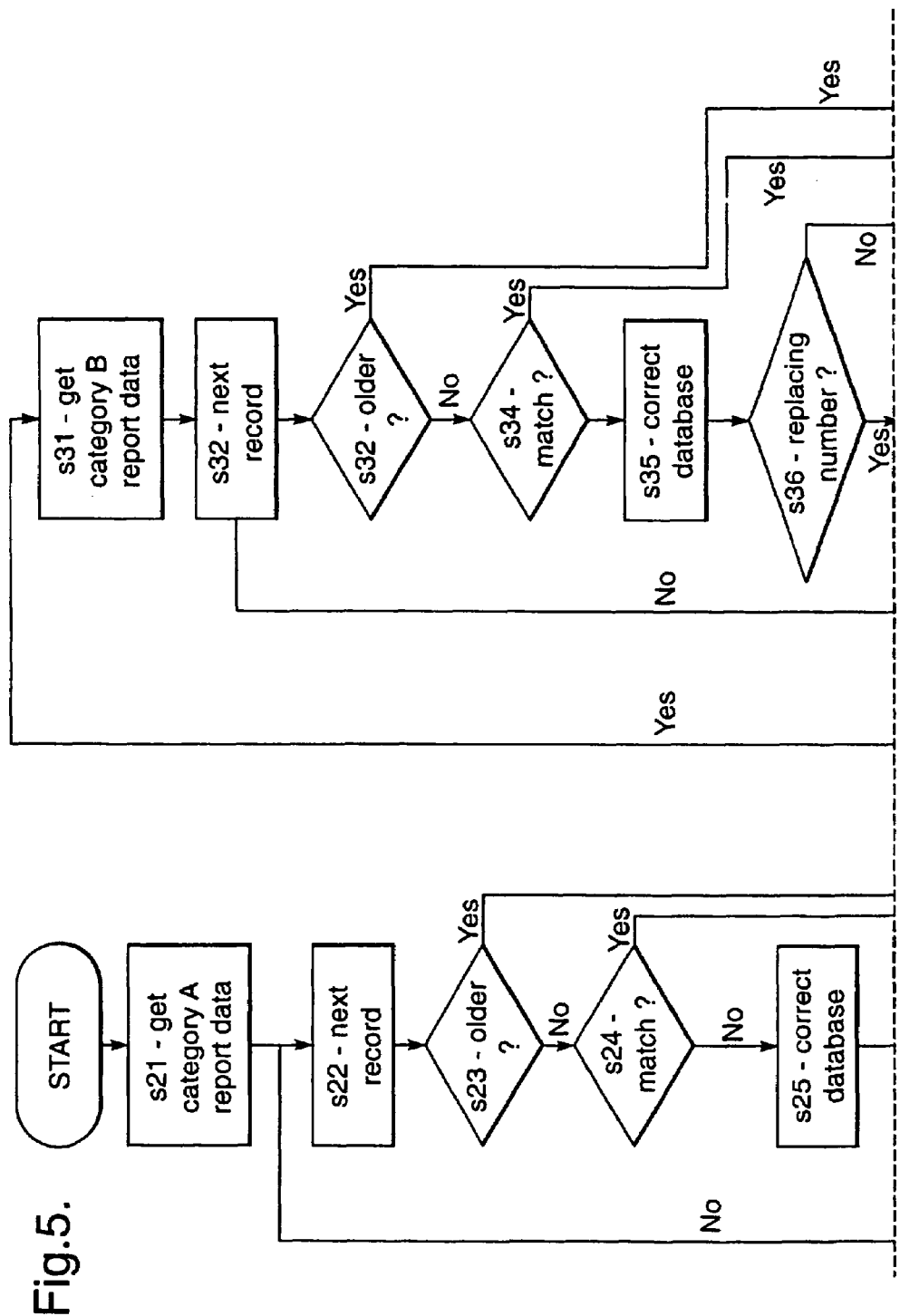
FIG. 5 is a flowchart of a step of the process shown in FIG. 4.
Figure 5:
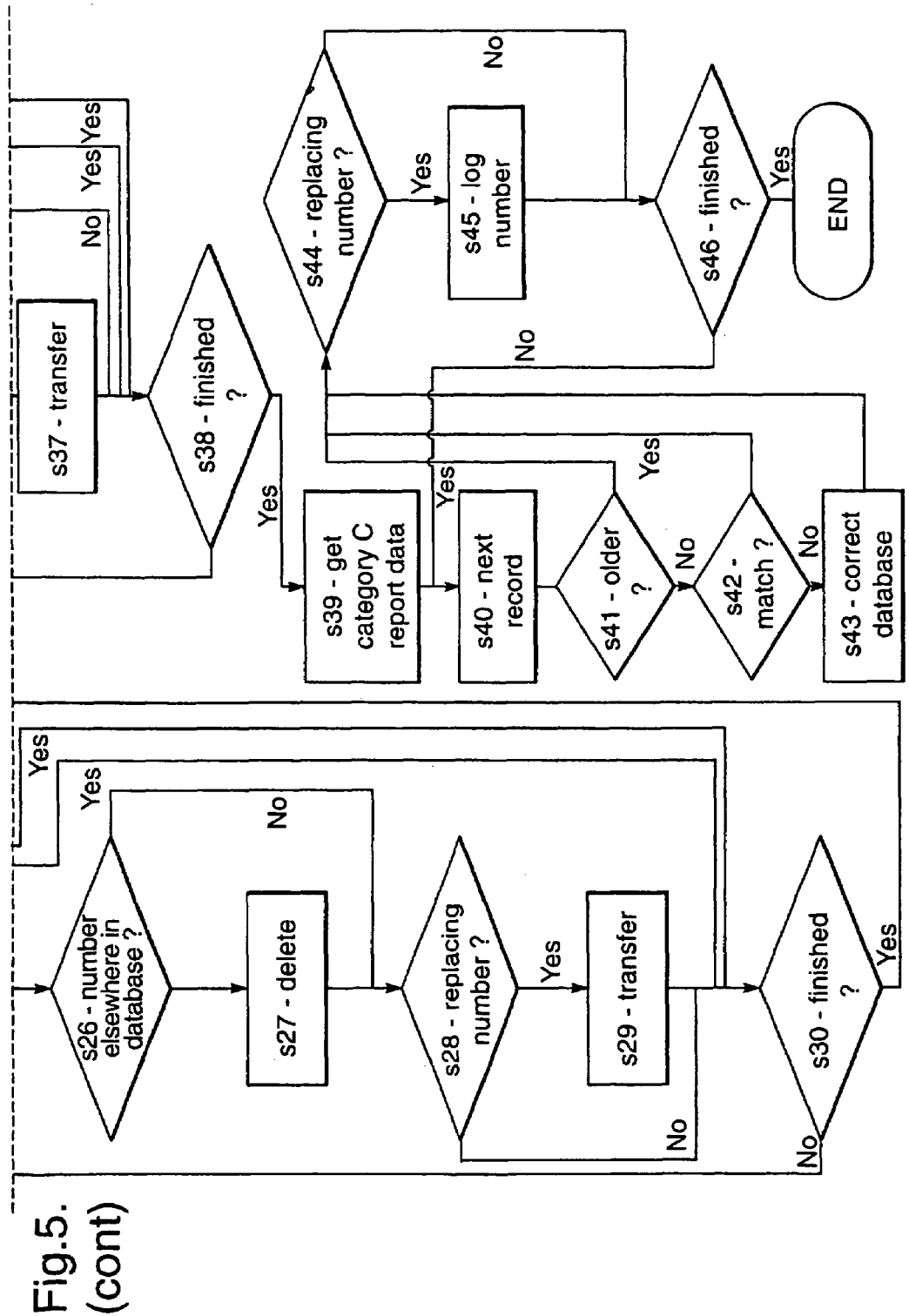

Referring to FIG. 5, in the processing of the data for each terminal pair in the validated report data, the data for category A terminal pairs is first retrieved from the local SQL database (step s21). For each record in the retrieved dataset (steps s22 and s29), it is determined whether the record is older than the corresponding entry in the network status database 16 (step s23). If the record is older, the process proceeds to step s30. However, if the record is not older, it is determined whether the circuit identity matches the value recorded for the same terminal pair in the network status database 16 (step s24). If there is a circuit identity match, the process proceeds to step s30.

If there is not a match at step s24, the network status database 16 record is corrected. If the new number already exists in the network status database 16 for a terminal pair at the same node 4, 6a, 6b, 6c, 7a, 7b, 7c, 8a, 8b, 8c (step s26), the corresponding record is updated to remove the number (step s27). The number, if any (step s28), originally recorded in the network status database 16 record is transferred notionally to a spare terminal pair at the same side (exchange or distribution) of the same node 4, 6a, 6b, 6c, 7a, 7b, 7c, 8a, 8b, 8c (step s29).

When all of the category A terminal pairs have been processed (step s30), the data for the category B terminal pairs is retrieved from the local SQL database (step s31).

For each record in the retrieved dataset (steps s32 and s38), it is determined whether the record is older than the corresponding entry in the network status database 16 (step s33). If the record is older, the process proceeds to step s38. If the record is not older, it is determined whether there is a line type match between the current record in the retrieved dataset and the corresponding record in the network status database 16 (step s34). If there is a match, the process proceeds to step s38. However, it there is not a match (step s34), the network status database 16 record is corrected (step s35). If this correction involved deleting a circuit identity (step s36), the deleted number is transferred notionally to a spare terminal pair in the same cable (step s37).

When all of the category B terminal pairs have been processed (step s38), the category C terminal pairs are retrieved from the local SQL database (step s39).

For each record in the retrieved dataset (steps s40 and s46), it is determined whether the record is older than the corresponding entry in the network status database 16 (step s41). If the record is older, the process proceeds to step s46.

If the record is not older, it is determined whether the status of the terminal pair, as determined by the test code and test description, matches that in the corresponding record of the network status database 16 (step s42). If there is a match, the process proceeds to step s46. However, if there is not a match, the network status database 16 is updated with the data from the report (step s43). If the network status database 16 record includes a Circuit identity, the number is logged (step s45) so that further investigations can be carried out to locate the actual associated terminal pair.

The above described process can be performed using report data from MDFs 4 and the exchange and distribution sides of PCPs 6*a*, 6*b*, 6*c*, SPCs 7*a*, 7*b*, 7*c* and DPs 8*a*, 8*b*, 8*c*.

Statistics providing a summary of the process are available. Electrical test data will not be available for occupied lines. However, the electrical test results for category C terminal pairs can be used to identify faulty lines that require repair.

Whilst it would be possible to check every copper pair, this would be a massive undertaking. A further aspect of the present invention relates to a method for validating connection data for a telephone network to produce data having a high confidence level without the investment in resources required for a complete test of all copper pairs.

Figure 6:
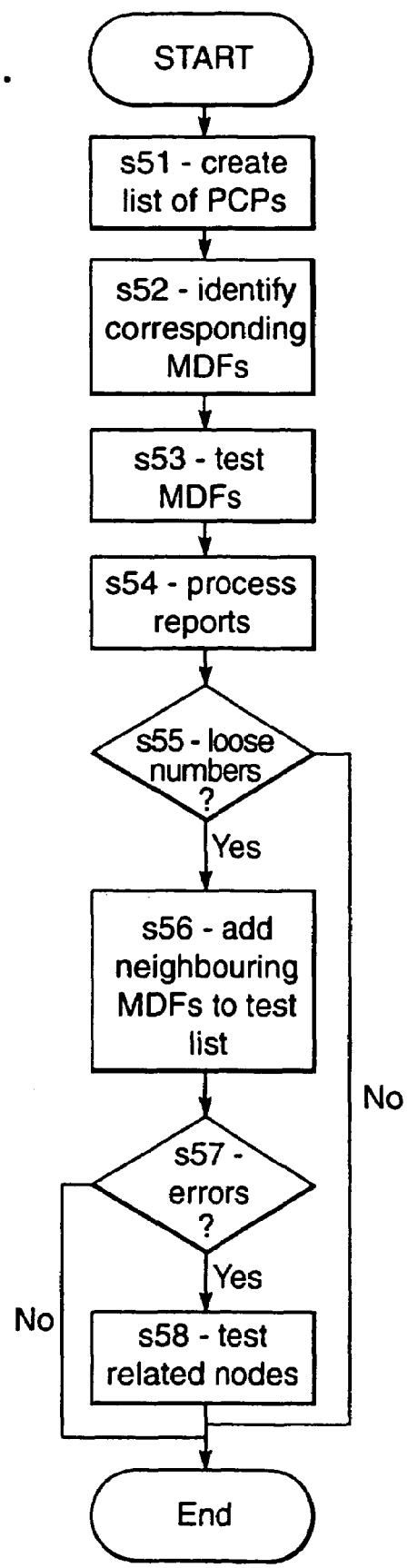
FIG. 6 is a flowchart of a method of performing a network-wide audit.

Referring to FIG. 6, initially PCPs which are recorded in the network status database 16 as having few spare copper pairs or for which the network status database 16 data is known to be poor. The quality of the network status database 16 data can be assessed from the frequency of errors, such as lines allocated to new connections being occupied, detected by engineers (step s51).

The cables linking these PCPs to exchanges, and consequently the associated MDFs, are then determined (step s52). This provides a list of MDFs to examine.

Automatic test equipment is installed at the MDFs in the list and reports, as described above, are generated (step s54). These reports are then processed as described above (step s55).

If any circuit identities are removed from the network status database 16 (step s56), an investigation is made of neighbouring MDFs at the same exchange in order to locate terminal pairs associated with these numbers (step s57). This investigation may be encompassed in an already scheduled test.

For each cable for which a network status database 16 record update has occurred (step s58), the terminal pairs of the terminating PCP are tested and the resultant reports processed as described above for updating the network status database 16 (step s59). Both the exchange and distribution sides are tested. If any updates are made on the distribution side, the affected SCPs are then similarly tested and likewise DPs are selected for testing on the basis of the SCP tests.

It will be appreciated that many modifications may be made to the exemplary embodiment described. For example, a plurality of network status databases may be used to hold the status data for different parts of a network.

The invention claimed is:

1. A method of validating connection data for a node of telephone network, the method comprising: generating a report file for terminal pairs at a network node, the report comprising, for each terminal pair, a record including data identifying the terminal pair, data identifying an associated circuit ID, if any, data identifying the type of the line, if any, using the terminal pair and data reporting electrical testing of the line, if any, using the terminal pair; allocating each record to one of three categories, the first category comprising terminal pairs for which there is an associated circuit ID, the second category comprising terminal pairs for which there is a line type but no circuit ID and the third category comprising unallocated lines; for each record in the first category, updating a corresponding record in a network status database in dependence on the record; for each record in the second category, updating a corresponding record in a network status database in dependence on the record; and for each record in the third category, updating a corresponding record in a network status database in dependence on the record, wherein circuit IDs in the network status database that are deleted by updating in respect of first and second category records are recorded against a record in the network status database corresponding to a third category record and circuit IDs in the network status database that are deleted by updating in respect of third category records are logged to provide a list of circuit IDs for which further investigation is required.

2. A method according to claim 1, wherein a record in the network status database is only updated if it is older than the corresponding record in the report file.

3. A method according to claim 1, wherein updating a circuit ID field in dependence on a first or second category record comprises searching for and deleting, if found, the replacing ID in the network status database records corresponding to the third category records.

4. A method according to claim 1, including performing a validation process on the records from the report file, determining the proportion of well-formed records and proceeding with the updating of the network status with the well-formed records only if the well-formed records form a predetermined proportion of the records in the report file.

5. A method according to claim 4, wherein said proportion is greater than 54%.

6. A method of validating connection data for a telephone network, the method comprising the steps of: (a) selecting a telephone network exchange node on the basis of a spare capacity criterion or a record error criterion; (b) performing a method according to claim 1 in respect of the selected node; and (c) selecting a further node in dependence on the updating of the network status database in step (b).

7. A method according to claim 6, wherein said further node is a neighbouring telephone exchange node and is selected in the event that a circuit identity associated with the initially selected node in the network status database has not been located in step (b).

8. A method according to claim 6, wherein said further node is a node connected to said initially selected node and is selected in the event that a network status database record is altered in step (b).

9. Apparatus arranged to implement the method of claim 1.

10. A computer program comprising a set of instructions to cause a computer to perform the method according to claim 1.

11. A suite of at least one computer programs for use with one or more computers to carry out the method as set out in claim 1.

12. A method of validating connection data for a node of telephone network, the method comprising: generating a report file for terminal pairs at a network node, the report comprising, for each terminal pair, a record including data identifying the terminal pair, and capable of associating with the record identifying the terminal pair at least one of the following data: data identifying an associated circuit ID, and/or data identifying a type of line using the terminal pair, and/or data reporting electrical testing of a line using the terminal pair; and for each terminal pair, determining if a circuit ID is associated with the terminal pair; determining if a line type is associated with the terminal pair; allocating each record to one of three categories, the first category comprising terminal pairs for which there is an associated circuit ID, the second category comprising terminal pairs for which there is a line type but no circuit ID and the third category comprising unallocated lines; for each record in the first category, updating a corresponding record in a network status database in dependence on the record; for each record in the second category, updating a corresponding record in a network status database in dependence on the record; and for each record in the third category, updating a corresponding record in a network status database in dependence on the record, wherein circuit IDs in the network status database that are deleted by updating in respect of first and second category records are recorded against a record in the network status database corresponding to a third category record and circuit IDs in the network status database that are deleted by updating in respect of third category records are logged to provide a list of circuit IDs for which further investigation is required.

\* \* \* \* \*